United States Patent [19]

Miyashita et al.

[11] Patent Number: 5,248,553
[45] Date of Patent: Sep. 28, 1993

[54] COATED MOLDED ARTICLE

[75] Inventors: Susumu Miyashita; Makoto Sugiura, both of Tokyo, Japan

[73] Assignee: Toyo Ink Manufacturing Co., Ltd., Tokyo, Japan

[21] Appl. No.: 732,409

[22] Filed: Jul. 19, 1991

Related U.S. Application Data

[63] Continuation-in-part of Ser. No. 451,190, Dec. 15, 1989, abandoned.

[30] Foreign Application Priority Data

Mar. 16, 1989 [JP] Japan .................... 1-64442

[51] Int. Cl.$^5$ .................... B32B 5/06; B32B 5/22
[52] U.S. Cl. .................... 428/297; 428/303; 428/413; 428/424.2; 428/480; 252/511
[58] Field of Search ............... 428/297, 303; 252/511

[56] References Cited

U.S. PATENT DOCUMENTS 4,596,670 6/1986 Liu .................... 252/511
4,855,347 8/1989 Falline et al. .................... 524/267
4,973,514 11/1990 Gamble et al. .................... 428/297

FOREIGN PATENT DOCUMENTS 0112197 6/1984 European Pat. Off. .
2047253 11/1980 United Kingdom .
2112796 7/1983 United Kingdom .

Primary Examiner—George F. Lesmes
Assistant Examiner—Chris Raimund
Attorney, Agent, or Firm—Wenderoth, Lind & Ponack

[57] ABSTRACT

A coated molded article obtained by coating a lacquer containing an organic solvent on a molded article produced from a resin composition comprising 100 parts by weight of one resin selected from the group consisting of an acrylonitrile-butadiene-styrene terpolymer resin, a mixture of said terpolymer with a polyvinyl chloride resin, and an acrylonitrile-ethylene propylene rubber-styrene terpolymer resin, 10 to 50 parts by weight of thermoplastic polyester resin, and 1 to 100 parts by weight of an electrically conductive fiber.

9 Claims, No Drawings

COATED MOLDED ARTICLE

This application is a continuation-in-part of now abandoned application Ser. No. 07/451,190, filed Dec. 15, 1989, now abandoned.

FIELD OF THE INVENTION

The present invention relates to a coated molded article produced from a resin composition having excellent shielding characteristics against electromagnetic waves. More specifically, it relates to a coated molded article produced from a resin composition which causes no degradation of impact strength and no defective appearance and has excellent shielding characteristics against electromagnetic waves.

PRIOR ART OF THE INVENTION

Housings of computers, communication devices, etc., are conventionally formed of a thermoplastic resin such as an acrylonitrile-butadiene-styrene terpolymer resin, a polystyrene resin, a modified polyphenylene oxide resin (to be referred to as "PPO resin" hereinbelow), a polycarbonate resin, or the like. Since, however, these resins have no shielding characteristics against electromagnetic waves, various fabricating processes are carried out to impart the housings with shielding characteristics against electromagnetic waves.

For example, a new electrically conductive layer is formed on a plastic molded article by flame-spraying with zinc or plating the interior surface of the housing with nickel, coating an electrically conductive coating composition thereon, applying a metal sheet, or the like, whereby the housing is imparted with reflectivity to electromagnetic waves. As a result, leakage of radiant electromagnetic waves is prevented, and external electromagnetic waves are shielded.

In addition to the above fabricating processes to impart plastic molded articles with shielding characteristics against electromagnetic waves, it has been recently proposed to make molding materials per se electrically conductive in order to produce plastic molded articles having shielding characteristics against electromagnetic waves. For example, Japanese Patent Laid-Open Publication No. 43126/1980 discloses resin-processed articles produced by incorporating an electrically conductive fiber such as a carbon fiber, metallic fiber, or the like into a synthetic resin. Japanese Patent Laid-Open Publication No. 13516/1985 discloses a multilayered, molded article produced by injection-molding a thermoplastic resin on one surface or two surfaces of an injection-molded article of a thermoplastic resin having an electrically conductive filler. Japanese Patent Publication No. 26783/1988 discloses a pillar-shaped member formed of an electrically conductive fiber bundle, a plastic portion impregnating into the bundle and another plastic portion covering the peripheral surface of the fiber bundle and containing no electrically conductive fiber.

An electrically conductive plastic having a stainless steel fiber incorporated as an electrically conductive fiber exhibits shielding characteristics against electromagnetic waves even if the amount of the stainless steel fiber is extremely smaller than that of other electrically conductive fillers. Thus, the stainless steel fiber is excellent in view of moldability, tinting, low costs, and the like. Further, since a carbon fiber and a metal-coated carbon fiber also exhibit excellent shielding characteristics against electromagnetic waves even in a relatively smaller amount, there have been many proposals for application thereof into structural parts as well as an effect of strength reinforcement as a plastic composite material.

The above plastic composite materials having a stainless steel fiber, carbon fiber, or the like incorporated having a problem that they cause defective appearance in use requiring decorative coating due to the incorporated, electrically conductive fiber when a normally usable one-pack type acrylic lacquer coating composition or the like is coated. That is, streaked, small concaves and convexes (silver streak) occur on a surface layer due to the incorporated, electrically conductive fiber, and steak patterns are existent even after the surface is coated. The stainless steel fiber also causes defective appearance, since the bent fiber pieces thereof present near the surface stick out when the surface resin layer is impregnated with a coating composition. Further, impact strength is badly decreased, presumably due to microvoids existing in the interface between the electrically conductive fiber and the resin.

SUMMARY OF THE INVENTION

It is an object of the present invention to provide a coated molded article produced from a resin composition having excellent shielding characteristics against electromagnetic waves.

It is another object of the present invention to provide a coated molded article produced from a resin composition which is free from causing defective appearance on a molded article even if the molded article therefrom is provided with a decorative coating of one-pack type acrylic lacquer, etc.

It is a further object of the present invention to provide a coated molded article produced from a resin composition which can form molded articles having excellent impact strength.

According to the present invention, there is provided a coated, molded article obtained by coating a lacquer containing an organic solvent on a molded article produced from a resin composition comprising 100 parts by weight of one resin selected from the group consisting of an acrylonitrile-butadiene-styrene terpolymer resin, a mixture of said terpolymer with a polyvinyl chloride resin, and an acrylonitrile-ethylene propylene rubber-styrene terpolymer resin, 10 to 50 parts by weight of thermoplastic polyester resin, and 1 to 100 parts by weight of an electrically conductive fiber.

DETAILED DESCRIPTION OF THE INVENTION

The present invention provides a coated molded article which is obtained by coating a lacquer containing an organic solvent on a molded article produced from a resin composition comprising 100 parts by weight of an acrylonitrile-butadiene-styrene terpolymer resin or an acrylonitrile-ethylene propylene rubber-styrene terpolymer resin, 10 to 50 parts by weight of thermoplastic polyester resin, and 1 to 100 parts by weight of an electrically conductive fiber.

The present invention further provides a coated molded article obtained b coating a lacquer containing an organic solvent on a molded article produced from a resin composition comprising 30 to 70 parts by weight of an acrylonitrile butadiene-styrene terpolymer resin, 30 to 70 parts by weight of polyvinyl chloride resin, 10 to 50 parts by weight of thermoplastic polyester resin, and 1 to 100 parts by weight of an electrically conductive fiber.

As the acrylonitrile-butadiene-styrene terpolymer resin (to be referred to as "ABS resin" hereinbelow) in the present invention, preferably usable are those resins which contain 15 to 25% by weight of acrylonitrile, 25 to 45% by weight of butadiene and 35 to 60% by weight of styrene. As the acrylonitrile-ethylene propylene rubber-styrene terpolymer resin (to be referred to as "AES resin" hereinbelow), preferably usable are those resins which contain 15 to 25% by weight of acrylonitrile, 25 to 45% by weight of an ethylene propylene rubber and 35 to 60% by weight of styrene. When the rubber content is smaller than the above lower limit, molded articles have poor impact strength, and when it is larger than the above upper limit, moldability and fluidity are hampered, and it is difficult to obtain any good molded article.

In the present invention, polyvinyl chloride resins having a polymerization degree of 600 to 1,200 are preferably usable.

The ABS resin or AES resin may contain various normally usable additives such as a dye, pigment, lubricant stabilizer, UV light absorber, plasticizer, dispersant, etc., and it is also possible to incorporate thereinto normally usable inorganic fillers such as talc, calcium carbonate, magnesium oxide, magnesium hydroxide, barium sulfate, calcium titanate, glass beads, glass fiber, etc.

Furthermore, in order to impart flame retardancy, it is also possible to add various flame retardants such as an organic halogen compound, organic phosphate compound, organic phosphite compound, red phosphorus, boron-based compound, antimony trioxide, antimony pentoxide, etc.

An ABS-polyvinyl chloride (to be referred to as "PVC resin" hereinbelow) prepared by blending an ABS resin with PVC is often used as a flameproofing ABS resin, and incorporation of an electrically conductive fiber into a resin mixture of this ABS-PVC resin with a thermoplastic polyester resin can also give excellent appearance to a coated surface and exhibit impact resistance.

The amount of the thermoplastic polyester resin per 100 parts of the ABS resin, the AES resin or a mixture of the ABS resin with the PVC resin is 10 to 50 parts by weight. When the amount is less than the above lower limit, the improvement in appearance of a coated surface with one-pack type acrylic lacquer, etc. is poor, and when it exceeds the above upper limit, the impact resistance is degraded to a great extent.

Examples of preferred thermoplastic polyester resins include polyethylene adipate, polyethylene sebacate, polyethylene terephthalate, polyethylene isophthalate, polybutylene terephthalate, polyethylene-2,6-naphthylate, polyarylate, polycarbonate, etc. These thermoplastic polyester resins may be used alone or in combination. Examples of the most preferably usable thermoplastic polyester resins are those which practically do not undergo much of hydrolysis, such as polyethylene terephthalate resin and polybutylene terephthalate resin.

Examples of the electrically conductive fiber usable in the present invention include metal fiber, carbon fiber, metal-coated carbon fiber, metal-coated glass fiber, etc. These electrically conductive fibers may be used alone or in combination. Among metal fibers, a stainless steel fiber is preferable since it has high strength and high rigidity, can maintain a high length/diameter ratio after molding, and exhibits high shielding characteristics against electromagnetic waves in a very small amount. A carbon fiber and metal-coated fiber are also preferably usable since they exhibit a characteristic similar to that of the stainless steel fiber.

The diameter of the metal fiber is preferably 4 to 60 $\mu$m, more preferably 6 to 20 $\mu$m, whereby it is possible to obtain high shielding characteristics against electromagnetic waves with a small fiber amount. A carbon fiber and metal-coated carbon fiber having a diameter of 6 to 20 $\mu$m are also preferably usable.

These electrically conductive fibers may be dispersed in and kneaded with a resin mixture of ABS resin or AES resin with a thermoplastic polyester resin or a resin mixture of ABS-PVC resin with a thermoplastic polyester resin. Further, a high-concentration dispersion containing 50 to 95% by weight of a electrically conductive fiber (so-called master batch) may be dispersed in the above resin mixture.

When the resin composition used in the present invention is applied to fields where further high impact resistance is required, e.g., housings of outdoor-oriented electric appliance, it is also possible to further incorporate 1 to 50 parts by weight of a variety of compositions which are normally usable as an impact modifier. When the amount of the impact modifier is less than 1 part by weight, almost no effect of the impact modifier can be obtained. When it exceeds 50 parts by weight, undesirably, the properties of the impact modifier per se become dominant, and the flexural modulus of the composition is greatly decreased. The amount of the impact modifier is most preferably 3 to 20 parts by weight, and in this case, it is possible to obtain a resin composition having well-balanced properties of impact resistance, flexural modulus, etc.

Examples of the impact modifier include an ethylene ethyl acrylate (EEA) resin, EEA-maleic anhydride (MAH) high pressure process ethylene copolymer resin, styrene-ethylene-butadiene-styrene (SEBS) block copolymer resin, acrylonitrile-styrene-ethylene glycidyl methacrylate (AS-EGMA) copolymer resin, etc. These impact modifiers may be used alone or in combination.

The lacquer for coating an outer surface of a molded article is selected from one-pack type acrylic lacquer, a two-pack type urethane lacquer, an acrylic emulsion coating composition, an epoxy lacquer, etc. The organic solvent is selected from ketone solvents such as methyl ethyl ketone, etc., aromatic solvents such as toluene, xylene, etc., and esters such as ethyl acetate, etc. A molded article can be coated with the above lacquer by air-spraying, brushing, etc.

The coated molded article provided by the present invention can be used as a housing for a computer, a video camera, a camera, a radiophone, etc.

The composition used in the present invention can be molded or formed into articles with a generally usable molding machine for plastics such as an injection molding machine, a die-extruder, a vacuum forming machine, a compression molding machine, or the like.

According to the present invention, there is provided a coated molded article produced from a resin composition, which is free from defective appearance even if the molded article is provided with a decorative coating of one-pack type acrylic lacquer, etc.

According to the present invention, there is further provided a coated molded article produced from a resin composition which has excellent impact strength.

EXAMPLES

The following Examples will illustrate the present invention further in detail. In Examples, "part" stands for "part by weight" unless otherwise specified.

EXAMPLES 1-4

An ABS resin (trade name, Denka ABS GR 3000, a rubber content 35% by weight, melt flow 9, manufactured by Denki Kagaku Kogyo) and a polybutylene terephthalate resin (to be referred to as "PBT" resin, a weight average molecular weight 67,000, melt flow 10) or a polyethylene terephthalate resin [to be referred to as "PET resin", intrinsic viscosity (IV value) 0.95] were formulated in amounts shown in Table 1, and stirred and mixed in a tumbler at 30 rpm for 10 minutes. Then, the mixture was melt-kneaded in a vent-type single screw extruder at a cylinder temperature of 240° C., a screw rotation number of 100 rpm and an output amount of 140 g/minute, and formed into strands. The strands were cut into pellets by using a pelletizer.

Eight parts of a chopped strand (length 4 mm, diameter 8 $\mu$m) prepared by sizing stainless steel continuous fiber (trade name, BEKI-SHIELD SPECIAL 302A, manufactured by NV BEKAERT SA) with a thermoplastic polyester resin, further coating the fiber with a thermoplastic resin and then cutting it was incorporated into 100 parts of the above-obtained pellets (Examples 1 and 4). 19 Parts of a chopped strand (length 6 mm, diameter 8 $\mu$m) of a carbon fiber (trade name, Besfight HTA-C6S, manufactured by Toho Rayon K.K.) was incorporated into 100 parts of the above-obtained pellets (Example 2). 9 Parts of a chopped strand (length 6 mm, diameter 8 $\mu$m) of a nickel-plated carbon fiber (trade name, Besfight MC-HTA-C6S, manufactured by Toho Rayon K.K.) was incorporated into 100 parts of the above-obtained pellets (Example 3). In each of the Examples, the resultant mixture was stirred and mixed in a tumbler at 30 rpm for 2 minutes, and then molded under the same injection molding conditions as those for molding of ordinary ABS resins, to give samples.

The samples were tested for an Izod impact strength (JIS K-7203), flexural modulus (JIS K-7110) and electromagnetic wave-shielding performance (Advantest method). One-pack type acrylic lacquer coating composition (trade name, Polynal No. 500N, manufactured by Ohashi Kagaku K.K.) and a thinner (trade name, Thinner No. 5600, manufactured by Ohashi Kagaku K.K.) were mixed in a 1:1 mixing ratio and the mixture was stirred to obtain a coating composition. Then, the coating composition was coated on the samples and dried, and the coated surfaces were visually examined.

COMPARATIVE EXAMPLES 1-3

Examples 1 to 3 were repeated except that the same ABS resin as that used in Example 1 was used in place of the ABS/PBT resin used in Examples 1 to 3.

EXAMPLES 5-6

Example 1 was repeated except that an AES resin (trade name, JSR AES-145, manufactured by Nippon Gosei Gomu K.K., rubber content 35% by weight, melt flow 8) was used (Example 5) or an ABS-PVC resin (trade name, Kaneka Enplex N340, PVC content 50% by weight, melt flow 15) was used in place of the ABS resin in Example 1.

COMPARATIVE EXAMPLES 4-5

Examples 5 and 6 were repeated except that an AES resin (the same resin as that used in Example 5) was used (Comparative Example 4) in place of the AES/PBT resin in Example 5 or an ABS-PVC resin (the same resin as that used in Example 6) was used (Comparative Example 5) in place of the ABS-PVC/PBT resin in Example 6.

EXAMPLES 7-9

An impact modifier [an EEA-MAH high pressure process ethylene copolymer resin (trade name, Bondine AX 8060, manufactured by Sumitomo C.D.F. Kagaku K.K.) (Example 7), an AS-EGMA copolymer resin (trade name, Modiper A4407, manufactured by Nippon Uka K.K.) (Example 8), or an SEBS block copolymer (trade name, Rabalon J6300, manufactured by Mitsubishi Uka K.K.) (Example 9)] was incorporated into the resin mixture of Example 1, and the procedure of Example 1 was repeated to obtain samples.

EXAMPLE 10

Example 1 was repeated except that an ABS resin having a small rubber content (trade name, Denka ABS QF, manufactured by Denki Kagaku Kogyo K.K., a rubber content 25% by weight, melt flow 40) was used in place of the ABS resin in Example 1, to obtain samples.

EXAMPLE 11

Example 1 was repeated except that an ABS/PBT/polycarbonate resin (weight average molecular weight 220, melt flow 20) was used in place of the ABS/PBT resin in Example 1, to obtain samples.

Table 1 shows the results of measurements of the samples obtained in Examples and Comparative Examples.

All of the molded articles obtained from the compositions of the present invention exhibited excellent appearances of coatings.

TABLE 1

| COMPOSITION (part by weight) | Examples | | | | | | | | | | | Comparative Examples | | | | |
|---|---|---|---|---|---|---|---|---|---|---|---|---|---|---|---|---|
| | 1 | 2 | 3 | 4 | 5 | 6 | 7 | 8 | 9 | 10 | 11 | 1 | 2 | 3 | 4 | 5 |
| Denka ABS GR3000 | 85 | 85 | 85 | 85 | | | 80 | 75 | 75 | | 80 | 100 | 100 | 100 | | |
| Denka ABS QF | | | | | | | | | | 85 | | | | | | |
| JSR AES 145 | | | | | 85 | | | | | | | | | | 100 | |
| Kaneka Enplex N340 | | | | | | 85 | | | | | | | | | | 100 |
| PBT Resin | 15 | 15 | 15 | | 15 | 15 | 15 | 15 | 15 | 15 | 10 | | | | | |
| PET Resin | | | | 15 | | | | | | | | | | | | |
| Polycarbonate resin | | | | | | | | | | | 10 | | | | | |
| Bondine AX8060 | | | | | | | 5 | | | | | | | | | |
| Modiper A4407 | | | | | | | | 10 | | | | | | | | |
| Rabalon J6300 | | | | | | | | | 10 | | | | | | 8 | 8 |
| Stainless steel fiber | 8 | | | 8 | 8 | 8 | 8 | 8 | 8 | 8 | 8 | 8 | | | 8 | 8 |

TABLE 1-continued

| COMPOSITION (part by weight) | Examples | | | | | | | | | | | Comparative Examples | | | | |
|---|---|---|---|---|---|---|---|---|---|---|---|---|---|---|---|---|
| | 1 | 2 | 3 | 4 | 5 | 6 | 7 | 8 | 9 | 10 | 11 | 1 | 2 | 3 | 4 | 5 |
| Carbon fiber | 19 | | | | | | | | | | | 19 | | | | |
| Nickel-plated carbon fiber | | 9 | | | | | | | | | | | | | | |
| MEASUREMENT RESULTS | | | | | | | | | | | | | | | | |
| Izod impact strength (kg · cm/cm$^2$) | 10 | 7 | 9 | 7 | 8 | 7 | 13 | 12 | 12 | 7 | 12 | 13 | 8 | 10 | 11 | 8 |
| Flexural modulus (kg/cm$^2$ × 10$^{-3}$) | 23 | 59 | 36 | 48 | 22 | 27 | 21 | 20 | 21 | 25 | 23 | 21 | 56 | 34 | 21 | 21 |
| Shielding effect | 53 | 27 | 62 | 51 | 54 | 58 | 52 | 54 | 53 | 55 | 54 | 53 | 25 | 58 | 52 | 50 |
| Appearance of coating | A | A | A | A | A | A | A | A | A | A | A | C | C | C | C | B |

Note 1: A spectrum analyzer TR4172 and a tool for measurement of shielding characteristic against electromagnetic wave, manufactured by Advantest were used.
Note 2: A; Excellent, B; Slightly defective but usable, C: Defective

What is claimed is:

1. A coated molded article obtained by coating a lacquer selected from the group consisting of a one-pack acrylic lacquer, a two-pack urethane lacquer, an acrylic emulsion coating composition and an epoxy lacquer containing an organic solvent on a molded article produced from a resin composition comprising 100 parts by weight of one resin selected from the group consisting of an acrylonitrile-butadiene-styrene terpolymer resin, a mixture of said terpolymer with a polyvinyl chloride resin, and an acrylonitrile-ethylene propylene rubber-styrene terpolymer resin, 10 to 50 parts by weight of a thermoplastic polyester resin selected from the group consisting of polyethylene adipate, polyethylene sebacate, polyethylene terephthalate, polyethylene isophthalate, polybutylene terephthalate and polyethylene-2, 6-naphthylate, and 1 to 100 parts by weight of an electrically conductive fiber.

2. A coated molded article according to claim 1, wherein the acrylonitrile-butadiene-styrene terpolymer resin contains 15 to 25% by weight of acrylonitrile, 25 to 45% by weight of butadiene and 35 to 60% by weight of styrene.

3. A coated molded article according to claim 1, wherein the acrylonitrile-ethylene propylene rubber-styrene terpolymer resin contains 15 to 25% by weight of acrylonitrile, 25 to 45% by weight of ethylene propylene rubber and 35 to 60% by weight of styrene.

4. A coated molded article according to claim 1, wherein the electrically conductive fiber is at least on fiber selected from the group consisting of a metal fiber, a carbon fiber, a metal-coated carbon fiber and a metal-coated glass fiber.

5. A coated molded article according to claim 4, wherein the metal fiber has a diameter of 4 to 60 μm.

6. A coated molded article according to claim 5, wherein the carbon fiber, metal-coated carbon fiber and metal-coated glass fiber have a diameter of 6 to 20 μm.

7. A coated molded article according to claim 1, wherein the mixture of the acrylonitrile-butadiene-styrene terpolymer resin with the polyvinyl chloride resin contains 30 to 70 parts by weight of said terpolymer resin and 70 to 30 parts by weight of the polyvinyl chloride resin.

8. A coated molded article according to claim 1, wherein the polyvinyl chloride resin has a polymerization degree of 600 to 1,200.

9. A coated molded article according to claim 1, wherein the organic solvent is at least one member selected from the group consisting of ketone solvents, aromatic solvents and ester solvents.

* * * * *